(12) United States Patent
Kulkarni

(10) Patent No.: US 7,606,816 B2
(45) Date of Patent: Oct. 20, 2009

(54) RECORD BOUNDARY IDENTIFICATION AND EXTRACTION THROUGH PATTERN MINING

(75) Inventor: Parashuram Kulkarni, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 499 days.

(21) Appl. No.: 11/192,620

(22) Filed: Jul. 28, 2005

(65) Prior Publication Data

US 2007/0027882 A1 Feb. 1, 2007

(30) Foreign Application Priority Data

Jun. 3, 2005 (IN) .............................. 471/KOL/05

(51) Int. Cl.
G06F 7/00 (2006.01)
G06F 17/00 (2006.01)
(52) U.S. Cl. ................................ 707/101; 707/1; 707/6; 707/100; 707/102; 707/104.1
(58) Field of Classification Search .................. 715/234, 715/237, 239
See application file for complete search history.

(56) References Cited

U.S. PATENT DOCUMENTS

| 5,875,446 A | | 2/1999 | Brown et al. |
| 5,977,890 A | * | 11/1999 | Rigoutsos et al. ............. 341/55 |
| 6,657,564 B2 | * | 12/2003 | Malik ........................... 341/51 |
| 2002/0056041 A1 | * | 5/2002 | Moskowitz ................. 713/176 |
| 2003/0115189 A1 | | 6/2003 | Srinivasa et al. |
| 2005/0097160 A1 | | 5/2005 | Stob |
| 2006/0010109 A1 | * | 1/2006 | Harrity .......................... 707/3 |
| 2006/0059173 A1 | | 3/2006 | Hirsch et al. |

OTHER PUBLICATIONS

"Conceptual-Model-Based Data Extraction from Multiple-Record Web Pages", Brigham Young University, Utah, USA, 1999, by Embley et al.*
Chang, Ahia-Hui, et al., "IEPAD: Information Extraction Based on Pattern Discovery," WWW10 '01, May 1-5, 2001, Hong Kong, ACM 1-58113-348-0, pp. 681-688. (Text on enclosed CD-Rom).
Cohen, William W., et al., "A Flexible System for Wrapping Tables and Lists in HTML Documents," Carnegie-Mellon University Department of Computer Science, Sep. 19, 2003, Retrieved from the internet at <www.cs.cmu.edu/People/wcohen/postscript/ws-chap-2002.pdf>, pp. 1-30. (Text on enclosed CD-Rom).

(Continued)

*Primary Examiner*—Tim T. Vo
*Assistant Examiner*—Garrett Smith
(74) *Attorney, Agent, or Firm*—Hickman Palermo Truong & Becker LLP; Christian A. Nicholes

(57) ABSTRACT

Techniques for identifying discrete records within a multi-record document are provided. According to one technique, a document is encoded based on some combination of visual tag encoding, text category encoding, and text content encoding that produces hash values based on the contents of portions of the document. According to one technique, repeating candidate patterns are identified in a document so encoded. The candidate patterns may be identified in a "fuzzy" manner that allows for some inconsistencies in the individual pattern instances. According to one technique, the identified candidate patterns are validated based on specified factors to determine a "best" pattern. According to one technique, the boundaries of discrete records in a multi-record document are marked based on the portions of the document that correspond to an identified repeating pattern.

26 Claims, 5 Drawing Sheets

OTHER PUBLICATIONS

Doorenbos, Robert B., et al., "A Scalable Comparison-Shopping Agent for the World-Wide Web," Department of Computer Science and Engineering, University of Washington, Seattle, WA., 10 pages. (Text on enclosed CD-Rom).

Eliassi-Rad, Tina, et al., "Using a Trained Text Classifier to Extract Information," Computer-Sciences Department, University of Wisconsin, located on the internet at: <http://www.cs.wisc.edu/~eliassi/tech_report.pdf#search='Using%20a%20Trained%20Text%20Classifier%20to%20Extract%20Information'>, pp. 1-4. (Text on enclosed CD-Rom).

Embley, D.W., et al., "Record-Boundary Discovery in Web Documents," Department of Computer Science, Brigham Young University, Dec. 1998, 12 pages. (Text on enclosed CD-Rom).

Hsu, Chun-Nan, et al., "Generating Finite-State Transducers for Semi-Structured Data Extraction from the Web," Information Systems, 1998, vol. 23, No. 8, pp. 521-538. (Text on enclosed CD-Rom).

Kushmerick, Nicholas, et al., "Information Extraction by Text Classification," Smart Media Institute, Computer Science Department, University College Dublin, located on the internet at <http://www.cs.ucd.ie/staff/nick/home/research/download/kushmerick-atem2001.pdf#search='Information%20Extraction%20by%20Text%20Classification'>, pp. 1-7. (Text on enclosed CR-Rom).

Kushmerick, Nicholas, et al., "Wrapper induction: Efficiency and expressiveness," Artificial Intelligence 118 (2000), pp. 15-68. (Text on enclosed CD-Rom).

Lerman, Kristina, et al., "Automatic Data Extraction from Lists and Tables in Web Sources," Information Science Institute, University of California, located on the internet at: <http://www.isi.edu/~lerman/papers/lerman-atem2001.pdf#search='Automatic%20Data%20Extraction%20from%20Lists%20and%20Tables%20in%20Web%20Sources>, pp. 1-6. (Text on enclosed CD-Rom).

Muslea, Ion, et al., "A Hierarchical Approach to Wrapper Induction," University of Southern California, <http://www.ai.sri.com/~muslea/PS/hwi_aa99.pdf#search='A%20Hierarchical%20Approach%20to%20Wrapper%20Induction'>, pp. 1-8. (Text on enclosed CD-Rom).

Nigam, Kamal, et al., "Text Classification from Labeled and Unlabeled Documents Using EM," Machine Learning, located on the internet at: <http://www.kamalnigam.com/papers/emcat-mlj99.pdf#search='Text%20Classification%20from%20Labeled%20and%20Unlabeled%20Documents%20Using%20EM'>, pp. 1-34. (Text on enclosed CD-Rom).

"String Matching Algorithms," Vilnius University, Department of Computer Science, Located on the internet at <www.mif.vu.lt/cs2/courses/ds99fa6.pdf>, pp. 1-25. (Text on enclosed CD-Rom).

Chang, Ahia-Hui, et al., "IEPAD: Information Extraction Based on Pattern Discovery," WWW10 '01, May 1-5, 2001, Hong Kong, ACM 1-58113-348-0, pp. 681-688.

Cohen, William W. et al., "A Structured Wrapper Induction System for Extracting Information Semi-Structured Documents," WhizBang! Labs, 7 pages.

Cohen, William W., et al., "A Flexible System for Wrapping Tables and Lists in HTML Documents," Carnegie-Mellon University Department of Computer Science, Sep. 19, 2003, Retrieved from the internet at <www.cs.cmu.edu/People/wcohen/postscript/ws-chap-2002.pdf>, pp. 1-30.

Doorenbos, Robert B., et al., "A Scalable Comparison-Shopping Agent for the World-Wide Web," Department of Computer Science and Engineering, University of Washington, Seattle, WA., 10 pages.

Eliassi-Rad, Tina, et al., "Using a Trained Text Classifier to Extract Information," Computer-Sciences Department, University of Wisconsin, located on the internet at: <http://www.cs.wisc.edu/~eliassi/tech_report.pdf#search='Using%20a%20Trained%20Text%20Classifier%20to%20Extract%20Information'>, pp. 1-4.

Embley, D.W., et al., "Record-Boundary Discovery in Web Documents," Department of Computer Science, Brigham Young University, Dec. 1998, 12 pages.

Hsu, Chun-Nan, et al., "Generating Finite-State Transducers for Semi-Structured Data Extraction from the Web," Information Systems, 1998, vol. 23, No. 8, pp. 521-538.

Kukarni, Parashuram, "REBIEX: Record Boundary Identification and Extraction through Pattern Mining," Yahoo Research and Development Centre, 15 pages.

Kushmerick, Nicholas, et al.,"Information Extraction by Text Classification," Smart Media Institute, Computer Science Department, University College Dublin, located on the internet at <http://www.cs.ucd.ie/staff/nick/home/research/download/kushmerick-atem2001.pdf#search='Information%20Extraction%20by%20Text%20Classification'>, pp. 1-7.

Kushmerick, Nicholas, et al., "Wrapper induction: Efficiency and expressiveness," Artificial Intelligence 118 (2000), pp. 15-68.

Lerman, Kristina, et al., "Automatic Data Extraction from Lists and Tables in Web Sources," Information Science Institute, University of California, located on the internet at: <http://www.isi.edu/~lerman/papers/lerman-atem2001.pdf#search='Automatic%20Data%20Extraction%20from%20Lists%20and%20Tables%20in%20Web%20Sources>, pp. 1-6.

Muslea, Ion, et al., "A Hierarchical Approach to Wrapper Induction," University of Southern California, <http://www.ai.sri.com/~muslea/PS/hwi_aa99.pdf#search='A%20Hierarchical%20Approach%20to%20Wrapper%20Induction'>, pp. 1-8.

Nigam, Kamal, et al., "Text Classification from Labeled and Unlabeled Documents Using EM," Machine Learning, located on the internet at: <http://kamalnigam.com/papers/emcat-mlj99.pdf#search='Text%20Classification%20from%20Labeled%20and%20Unlabeled%20Documents%20Using%20EM'>, pp. 1-34.

"String Matching Algorithms," Vilnius University, Department of Computer Science, Located on the internet at <www.mif.vu.lt/cs2/courses/ds99fa6.pdf>, pp. 1-25.

* cited by examiner

Software Engineer

Location :  Sunnyvale, CA, USA

Reponsibilities of this job include ......The candidate should have strong communication skills, ...... good in c, c++ .......

Email resume to :  resumes@yahoo.com

System Administrator

Location :  Bangalore, IND

Reponsibilities of this job include ......The candidate should have strong communication skills, ...... good knowledge of UNIX......

Email resume to :  resumes@yahoo.com

Project Manager

Location :  Mountain View, CA, USA

Reponsibilities of this job include ......The candidate should have strong managerial skills, ...... good knowledge of .......

Email resume to :  resumes@yahoo.com

FIG. 1 (PRIOR ART)

RECORD BOUNDARY IDENTIFICATION AND EXTRACTION THROUGH PATTERN MINING

CLAIM OF PRIORITY TO APPLICATION FILED IN FOREIGN COUNTRY

The present application claims priority under 35 USC §119(a) to an application for patent filed in India on Jun. 3, 2005, the title of that application being "RECORD BOUNDARY IDENTIFICATION AND EXTRACTION THROUGH PATTERN MINING," and the application number of that application being 471/KOL/05.

FIELD OF THE INVENTION

The present invention relates to data processing and, more specifically, to record boundary identification and extraction on HTML/text documents through pattern mining.

BACKGROUND

Web sites present information on various topics in various formats. A great amount of effort is often required for a user to manually locate and extract useful data from the web sites. Therefore, there is a great need for value-added services that integrate information from multiple sources. For example, such services include customizable web information gathering robots/crawlers, comparison-shopping agents, meta-search engines and news bots, etc.

To facilitate the development of these information integration systems, good tools are needed for information gathering and extraction. In situations where data has been collected from different Web sites, a conventional approach for extracting data from various web pages uses programs called "wrappers" or "extractors" to extract the contents of the web pages. These programs typically consider the information presented on a single document as single record of extracted results.

However, often, in web pages, the information to be extracted is placed in a structure that has a particular alignment. The structure forms repetitive patterns. For example, queryable or searchable Internet sites such as web search engines often produce web pages with large itemized match results that are displayed in a particular template format as multiple records/elements of information with identical structure and alignment.

The template can be recognized when, for each element of the web document, a string that indicates the appearance and category of the element can be determined. Repetitive patterns are formed where each pattern represents one record/element of information. The pattern may not always be exactly repeating and may have slight inconsistencies.

FIG. 1 is a diagram illustrating a sample Hypertext Markup Language (HTML) page that contains multiple informational records. Each record represents a separate job opportunity. The page contains repeated patterns. Many searchable web sites, like job posting sites, search engines, and shopping sites, also exhibit such repeated patterns since these sites usually extract data from relational databases and produce dynamic web pages with a predefined format style.

In order to extract data from pages such as the page shown in FIG. 1, record boundaries need to be identified. Each record needs to be treated as a separate piece of information.

Current approaches for identifying record boundaries suffer from some serious limitations. Many approaches require some form of human intervention or training data and, as a result, are not easily applied to large-scale tasks. Several approaches rely on the record-containing document being formatted in a known way, and, as a result, are inapplicable to documents that are not formatted in that known way or if the structure changes over time from that known way. For example, some approaches require the record-containing document to be an HTML document that conforms to a specified scheme. These approaches fail when applied to documents that are not in HTML, or which depart from the scheme even to a minor extent or if the HTML document changes in structure or alignment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a diagram illustrating a sample Hypertext Markup Language (HTML) page that contains multiple informational records;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, record boundaries within a multi-record document are identified by considering text content in addition to or instead of HTML formatting. According to one embodiment of the invention, record boundaries are identified via an algorithm that "mines" repeating patterns in a "fuzzy" way, so that the records can be identified even if they vary significantly from each other. According to one embodiment of the invention, a system automatically identifies and validates repeated patterns based on structural elements and contents of documents, without any human intervention, and without any training data. According to one embodiment of the invention, a document is encoded in a manner so that similar types of data items are represented by similar symbols. Repeating patterns can be determined by locating repeating symbol sequences, and record boundaries can be determined based on the repeating patterns.

Example System Architecture

Figure 2:
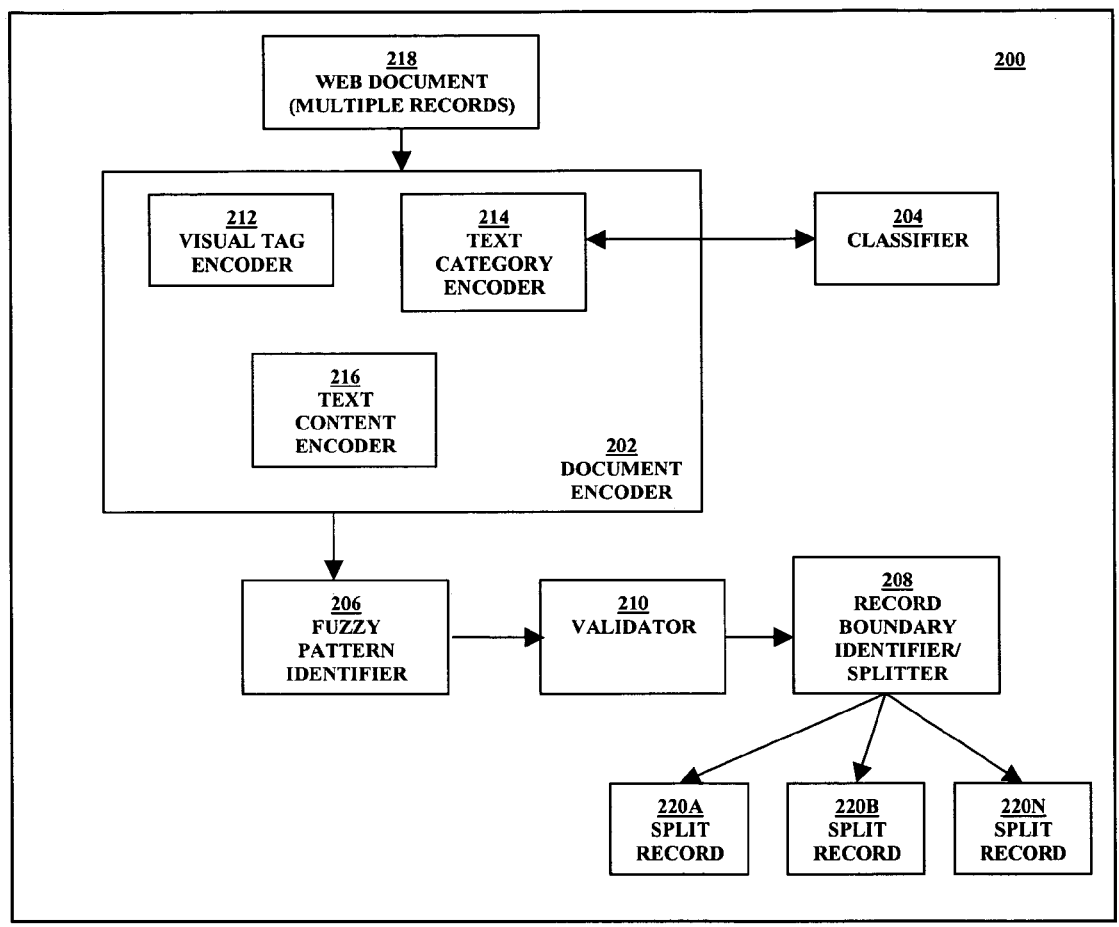
FIG. 2 is a block diagram illustrating a high-level functional view of the architecture of an example system that employs techniques described herein in order to identify record boundaries in a multi-record document, according to an embodiment of the invention.

FIG. 2 is a block diagram illustrating a high-level functional view of the architecture of an example system that employs techniques described herein in order to identify record boundaries in a multi-record document, according to an embodiment of the invention. System 200 comprises a document encoder 202, a classifier 204, a fuzzy pattern identifier 206, a record boundary identifier/splitter 208, and a validator 210. Document encoder 202 includes a visual tag encoder 212, a text category encoder 214, and a text content encoder 216. Each of the elements of system 200 may be implemented as a separate programmatic module that is executable on a computer, for example.

Document encoder 202 receives a web document 218. Web document 218 comprises multiple records, each of which comprises one or more distinct data items. Each data item may comprise one or more words and formatting tags, for example. Document encoder 202 encodes web document 218 into a sequence of symbols. Each symbol represents a type of data item, and data items of the same type are represented by the same symbol. Document encoder 202 uses classifier 204 to categorize and encode recognized data items based on the contents of those data items.

Fuzzy pattern identifier 206 receives the sequence of symbols from document encoder 202 and identifies repeating symbol subsequences in a fuzzy manner. Fuzzy pattern identifier 206 does this generally by replacing multiple consecutive occurrences of each subsequence with a single occurrence of that subsequence and then removing non-repeating symbols that occur between repeating sequences. Fuzzy pattern identifier 206 may repeat this process multiple times in order to refine the overall sequence. Each time, fuzzy pattern identifier 206 may increase the size of the subsequences that are considered for replacement. By removing such non-repeating symbols, fuzzy pattern identifier 206 accounts for minor inconsistencies between records; the inconsistencies in a record therefore do not prevent the record from being identified as such.

Validator 210 receives one or more refined sequences and determines, by evaluating those sequences against a specified set of criteria, whether the records that are determined based on those sequences are adequate. If a sequence fails to satisfy criteria to a certain threshold level, then the sequence is deemed to be inadequate for use in determining record boundaries.

Record boundary identifier/splitter 208 receives a refined and validated sequence of symbols from validator 210. Record boundary identifier/splitter 208 matches the symbols in the refined sequence with the corresponding data items in web document 218. For each set of data items that matches the refined sequence, record boundary identifier/splitter 208 determines that set of data items to be a distinct record, and marks the beginning and end of that record.

Once the record boundaries within web document 218 have been identified and validated, web document 218 may be split into multiple split records 220A-N. Each of split records 220A-N contains a separate portion of web document 218 that corresponds to a validated sequence of symbols.

Document Encoder

As is described above, document encoder 202 comprises visual tag encoder 212, text category encoder 214, and text content encoder 216. Visual tag encoder 212 encodes portions of web document 218 that are enclosed by HTML tags that affect the visual appearance of the enclosed portion. Visual tag encoder 212 encodes these portions by replacing the portions with symbols that correspond to the enclosing tags.

Text category encoder 214 encodes portions of web document 218 that correspond to known categories of content. Text category encoder 214 encodes these portions by replacing these portions with symbols that correspond to the categories to which the portions belong. Text category encoder 214 uses classifier 204 to locate, within web document 218, data items that fit into known categories.

After visual tag encoder 212 and text category encoder 214 have encoded portions of web document 218, some portions of web document 218 may remain unencoded; these portions may remain in their original form. Text content encoder 216 encodes each such remaining portion by generating a hash value based on the content of that remaining portion, and then replacing that remaining portion with a symbol that corresponds to the hash value. Thus, if multiple portions of web document 218 are exactly the same, then these portions are replaced by the same symbol.

Visual Tag Encoding

As is discussed above, visual tag encoder 212 encodes portions of web document 218 that are enclosed by HTML tags that affect the visual appearance of the enclosed portion. Since HTML tags are the basic components for data presentation, and since the text string between tags are exactly what a user sees in his browser, the text string between two tags, as well as the tags themselves, may be regarded as one unit. Some repeating patterns are realized by the repetition of visual characteristics of the text, which are governed by the HTML tags responsible for visual appearance of the text.

According to one embodiment of the invention, an HTML translation technique is used to encode portions of an HTML document. As a result of the HTML translation technique, any HTML tags that are responsible for the visual appearance of a text string are translated into a symbol that represents the HTML tags. In one embodiment of the invention, tags responsible for alignment and formatting are ignored since these tags do not contribute visual repetitiveness of text to the human eye.

According to one embodiment of the invention, for each tag in an HTML document, it is determined whether the tag is one of a specified set of tags that affect the visual appearance of text. Such tags may include tags that indicate that text is to be in a particular font, in a particular size, in a particular color, bolded, italicized, and/or underlined. In one embodiment of the invention, the specified set of tags includes the following tags: <H1> through <Hn>, <b>, <u>, <i>, <a>, and <strong>. In one embodiment of the invention, the specified set of tags excludes the following tags: <table>, <tr>, and <td>.

If the tag is included in the specified set of tags, then the tag's corresponding closing tag is removed from the document, the tag itself is replaced with a symbol that corresponds to the tag, and the text that was enclosed between the tags is enclosed between "<" and ">" characters instead. For example, using the technique described above, the data items "<H2>Software Engineer</H2>," "<H2>System Administrator</H2>," and "<H2>Project Manager</H2>" may be replaced with the symbol/string pairs "H<Software Engineer>," "H<System Administrator>," and "H<Project Manager>," respectively.

Alternatively, if a tag is not included in the specified set of tags, then the tag and its corresponding closing tag, if any, are removed from the document. However, text occurring between such tags is still considered to be a distinct data item. The text that was enclosed between the tags is still enclosed between "<" and ">" characters.

In one embodiment of the invention, different tags are replaced with different symbols. For example, the "<H2>" tag may be replaced with symbol "H," the "<b>" tag may be replaced with symbol "B," and the "<a>" tag may be replaced with symbol "A." However, in one embodiment of the invention, different tags that produce approximately the same visual effect may be replaced by the same symbol. For example, tags "<H1>" through "<Hn>," "<b>," and "<strong>" all may be replaced with the same symbol "B."

For example, prior to the application of the visual tag encoding technique described above, the HTML source for the web page shown in FIG. 1 is as follows:
<table>
<tr><td><H2>Software Engineer</H2></td></tr>
<tr><td><b>Location:</b></td><td>Sunnyvale, Calif., USA</td></tr>
<tr><td>Responsibilities of this job include. . . . The candidate should have strong communication skills, . . . good in c, c++ . . . </td></tr>
<tr><td><b>Email resume to:</b></td><td>
<a href="mailto: resumes@yahoo.com">resumes@yahoo.com</a>
</td></tr></table>
<table>
<tr><td><H2>System Administrator</H2></td></tr>
<tr><td><b>Location:</b></td><td>Bangalore, IND</td></tr>
<tr><td>Responsibilities of this job include. . . . The candidate should have strong communication skills, . . . good knowledge of UNIX . . . </td></tr>
<tr><td><b>Email resume to:</b></td><td>
<a href="mailto: resumes@yahoo.com">resumes@yahoo.com</a>
<td></tr></table>
<table>
<tr><td><H2>Project Manager</H2></td></tr>
<tr><td><b>Location:</b></td><td>Mountain View, Calif., USA</td></tr>
<tr><td>Responsibilities of this job include. . . . The candidate should have strong managerial skills, . . . good knowledge of . . . </td></tr>
<tr><td><b>Email resume to:</b></td><td>
<a href="mailto: resumes@yahoo.com">resumes@yahoo.com</a>
</td></tr></table>

After the application of the visual tag encoding technique to the foregoing HTML source, the resulting partially encoded document is as follows:
H<Software Engineer>B<Location:><Sunnyvale, Calif., USA><Responsibilities of this job include. . . . The candidate should have strong communication skills, . . . good in c, c++ . . . >B<Email resume to:>A<resumes@yahoo.com>H<System Administrator>B<Location:><Bangalore, IND><Responsibilities of this job include. . . . The candidate should have strong communication skills, . . . good knowledge of UNIX . . . >B<Email resume to:>A<resumes@yahoo.com>H<Project Manager>B<Location:><Mountain View, Calif., USA><Responsibilities of this job include. . . . The candidate should have strong managerial skills, . . . good knowledge of . . . >B<Email resume to:>A<resumes@yahoo.com>

In the above partially encoded document, the "<H2>," "<b>," and "<a>" tags in the original document have been replaced with "H," "B," and "A," respectively.

In some situations, a document does not contain such visually distinguishing tags. Some documents are not in HTML format. Even so, the content or the text class of each text element in the document may repeat across units of information. Described below are techniques for recognizing patterns under such circumstances. These techniques may be used to encode non-HTML documents and badly formatted HTML documents, for example, and to further encode documents that have been partially encoded using the visual tag encoding technique described above.

Text Category Encoding

As is discussed above, text category encoder 214 encodes portions of web document 218 that correspond to known categories of content. Text category encoder 214 uses classifier 204 to determine the categories to which data items belong. In one embodiment of the invention, text category encoder 214 further encodes a document that has been partially encoded by visual tag encoder 212.

Classifier 204 is a text classifier that categorizes data items that are known to belong to defined categories. For example, classifier 204 may determine whether a word or phrase from web document 218 is contained in a database. If the word or phrase is contained in the database, then classifier 204 may return, to text category encoder 214, the identity of a category that is associated with the word or phrase in the database.

Classifier 204 may use different databases, storing different associations, for different sets of web pages. For example, classifier 204 may consult a "job categories" database when processing web pages that are from job-related web sites, but classifier 204 may consult a "merchandise categories" database when processing web pages that are from shopping-related web sites. The category that is associated with a word or phrase in one database may differ from the category that is associated with the same word or phrase in another database. Thus, the categories to which words and phrases belong may depend to some extent on the context of the web pages in which those words and phrases are located.

Text classifiers that categorize words and phrases are well known in the art and, therefore, are not described in intricate detail herein. Additional information about text classifiers is available in the following published documents, each of which is incorporated by reference in its entirety for all purposes as though fully and originally disclosed herein: "Information Extraction by Text Classification," by Nicholas Kushmerick, Edward Johnston, and Stephen McGuiness, in *Proceedings of the IJCAI-*2001 *Workshop on Adaptive Text Extraction and Mining* (2001); "Text Classification From Labeled and Unlabeled Documents Using EM," by Kamal Nigam, Andrew McCallum, Sebastian Thrun, and Tom Mitchell, in *Machine Learning*, 39(2/3), pp. 103-134 (2000); and "Using a Trained Text Classifier to Extract Information," by Tina Eliassi-Rad and Jude W. Shavlik.

Referring to the sample web page in FIG. 1 for purposes of example, classifier 204 may determine that the data items "Software Engineer," "System Administrator," and "Project Manager" (all of which are enclosed with "<" and ">" characters after the visual tag encoding process) all belong to a "Job Title" category. Classifier 204 may additionally determine that the data items "Sunnyvale, Calif., USA," "Bangalore, IND," and "Mountain View, Calif., USA" all belong to a "Location" category.

In one embodiment, for each of the data items in the document for which a category has been determined, text category encoder 214 replaces that data item with a symbol that corresponds to that data item's category. Each category may be associated with a different symbol. For example, data items that belong to the "Job Title," "Location," and "Job Description" categories may be replaced with symbols "J," "L," and "D," respectively.

For example, prior to the application of the text category encoding technique described above, the partially encoded document produced by visual tag encoder 212 is as follows:

H<Software Engineer>B<Location:><Sunnyvale, Calif., USA><Responsibilities of this job include. . . . The candidate should have strong communication skills, . . . good in c, c++ . . . >B<Email resume to:>A<resumes@yahoo.com>H<System Administrator>B<Location:><Bangalore, IND><Responsibilities of this job include. . . . The candidate should have strong communication skills, . . . good knowledge of UNIX . . . >B<Email resume to:>A<resumes@yahoo.com>H<Project Manager>B<Location:><Mountain View, Calif., USA><Responsibilities of this job include. . . . The candidate should have strong managerial skills, . . . good knowledge of . . . >B<Email resume to:>A<resumes@yahoo.com>

After the application of the text category encoding technique to the foregoing partially encoded document, the resulting (still) partially encoded document is as follows:

H, J, B, <Location:>, L, D, B, <Email resume to:>, A, H, J, B, <Location:>, L, D, B, <Email resume to:>, A, H, J, B, <Location:>, L, D, B, <Email resume to:>, A In the above partially encoded document, data items that belong to the "Job Title," "Location," and "Job Description" categories have been replaced with "J," "L," and "D," respectively. Text for which no category could be determined remains in the partially encoded document, to be handled by the text content encoder as described below.

Text Content Encoding

As is discussed above, text content encoder 216 encodes each remaining unencoded data item by generating a hash value based on the content of that data item, and then replacing the data item with a symbol that corresponds to the hash value. According to one embodiment, for each remaining unencoded data item, the text within that data item is passed as input into a hash function. Based on the text, the hash function generates a hash value that corresponds uniquely to the text. If two strings of text are different, then the hash function produces two different hash values for the strings of text. If two strings of text are the same, then the hash function produces the same hash values for the strings of text.

In one embodiment of the invention, the hash function is MD5 or MD6. These hash functions avoid hash collisions.

Each hash value corresponds to a different symbol that differs from any of the symbols that are already contained in the partially encoded document. According to one embodiment of the invention, each unencoded data item in the partially encoded document is replaced with the symbol that corresponds to the hash value that was generated based on that data item. The result is a fully encoded document.

For example, prior to the application of the text content encoding technique described above, the partially encoded document might be:

H, J, B, <Location:>, L, D, B, <Email resume to:>, A, H, J, B, <Location:>, L, D, B, <Email resume to:>, A, H, J, B, <Location:>, L, D, B, <Email resume to:>, A In the process of application the text encoding technique, each instance of data item "<Location:>" may be replaced with one symbol, and each instance of data item "<Email resume to:>" may be replaced with another, different symbol.

Fuzzy Pattern Identification

Figure 3:
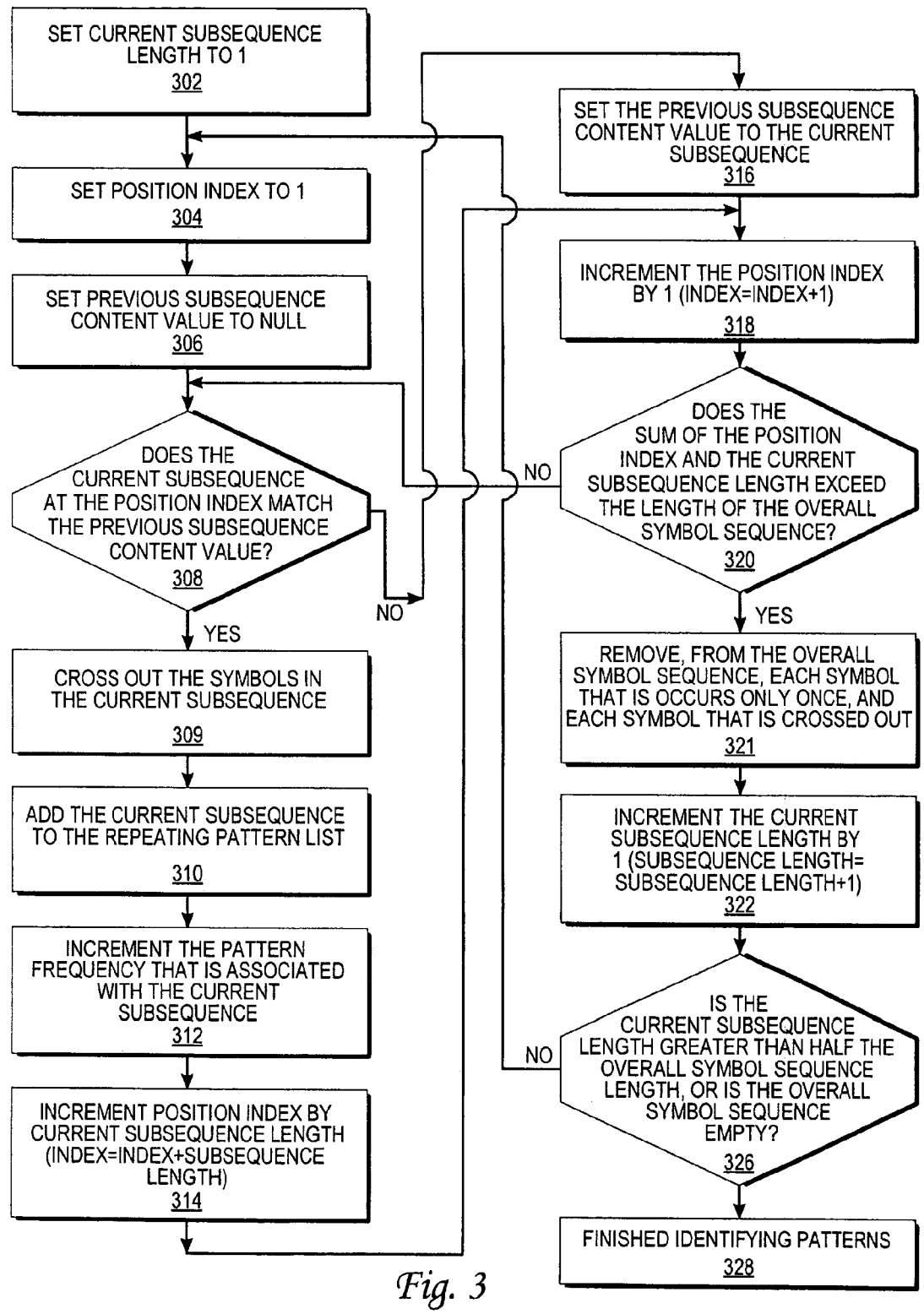
FIG. 3 is a flow diagram illustrating a technique for identifying patterns in a fuzzy manner, according to an embodiment of the invention.

As is discussed above, fuzzy pattern identifier 206 receives a sequence of symbols (i.e., the fully encoded document resulting from the techniques discussed above) and, in a fuzzy manner, identifies repeating symbol subsequences that occur within that sequence. FIG. 3 is a flow diagram illustrating a technique for identifying patterns in a fuzzy manner, according to an embodiment of the invention.

In block 302, a current subsequence length is set to equal "1." This is the initial size of repeating symbol subsequences that the fuzzy pattern identifier looks for in the overall symbol sequence. With each pass of the pattern identifying technique, the fuzzy pattern identifier looks for larger subsequences.

In block 304, a position index is set to equal "1." This is the initial position in the overall symbol sequence at which the fuzzy pattern identifier looks for repeating symbol subsequences. The first occurring symbol in the overall symbol sequence is at position "1."

In block 306, a previous subsequence content value is set to "null." The previous subsequence content value is used to store the subsequence that ends immediately before the position index in the overall symbol sequence. Since there is no subsequence that occurs prior to the beginning of the overall symbol sequence, the previous subsequence content value is initially set to "null."

In block 308, it is determined whether the current subsequence that begins at the position index in the overall symbol sequence matches the previous subsequence content value. If the current subsequence matches the previous subsequence, then control passes to block 309. Otherwise, control passes to block 316.

In block 309, the symbols in the current subsequence are "crossed out" in at the corresponding positions in the overall symbol sequence. Control passes to block 310.

In block 310, the current subsequence that begins at the position index in the overall symbol sequence is added to a repeating pattern list, if the current subsequence is not already in the repeating pattern list. Control passes to block 312.

In block 312, a pattern frequency that is associated with the current subsequence in the repeating pattern list is incremented. For each subsequence in the repeating pattern list, there is a corresponding pattern frequency that indicates how many times that subsequence occurs in the overall symbol sequence. This information is useful when validating patterns, as is described below. Control passes to block 314.

In block 314, the position index is incremented by the by the current subsequence length. Control passes to block 316.

In block 316, the previous subsequence content value is set to the value of the current subsequence that occurs at the position index in the overall symbol sequence. Thus, the previous subsequence becomes the current subsequence before the position index is incremented. Control passes to block 318.

In block 318, the position index is incremented by 1.

In block 320, it is determined whether the sum of the position index and the current subsequence length exceeds the length of the overall symbol sequence in terms of symbols. If the sum exceeds the length of the overall symbol sequence, then the end of the overall symbol sequence has been reached, and control passes to block 321. Otherwise, control passes back to block 308.

In block 321, each symbol that occurs only once in the overall symbol sequence, and each symbol that was "crossed out" in block 309, is removed from the overall symbol sequence. Control passes to block 322.

In block 322, the current subsequence length is incremented by 1.

In block 326, it is determined whether the current subsequence length is greater than half of the length of the overall symbol sequence, and whether the overall symbol sequence is empty. If the current subsequence length is greater than half of the overall symbol sequence length, or if the overall symbol sequence is empty, then control passes to block 328. Otherwise, control passes back to block 304, and the fuzzy pattern identifier begins to look for repetitions of slightly larger subsequences.

In block 328, the fuzzy pattern identification technique is completed. The patterns contained in the repeating pattern list are candidates for use in identifying record boundaries within the document, as described below.

An example of the application of the foregoing fuzzy pattern identification technique follows. If the overall symbol sequence initially comprises "B, B, B, D, B, D, A, T, Z, B, B, D, A, X, X, B, D, A," then the first pass of the technique removes singly occurring symbols "T" and "Z," and replaces all consecutive multiple occurrences of one-symbol subsequences "B" and "X" with single occurrences of those subsequences. The resulting overall symbol sequence then comprises "B, D, B, D, A, B, D, A, X, B, D, A." Subsequences "B" and "X" are added to the repeating pattern list.

The second pass of the technique removes singly occurring symbol "X" and replaces all consecutive multiple occurrences of two-symbol subsequence "B, D" with a single occurrence of that subsequence. The resulting overall symbol sequence then comprises "B, D, A, B, D, A, B, D, A." Subsequence "B, D" is added to the repeating pattern list.

The third pass of the technique does not remove any singly occurring symbols, because there are none, and replaces all consecutive multiple occurrences of three-symbol subsequence "B, D, A" within a single occurrence of that subsequence. The resulting overall symbol sequence then comprises "B, D, A." Subsequence "B, D, A" is added to the repeating pattern list.

At this point the technique has identified all of the possible repeating patterns in the original overall symbol sequence. The candidates for identifying boundaries in the initial document are the patterns in the repeating pattern list: "B," "X," "B, D," and "B, D, A." Each of these candidate patterns may be passed through a validation process that determines whether that candidate pattern is the "best" candidate pattern.

Pattern Validation

Above is an example that shows how repeated patterns can be discovered for a given overall symbol sequence. However, a typical document usually contains a large number of repeating patterns, not all of which accurately represent record boundaries. Therefore, according to one embodiment of the invention, a pattern validator is used to determine whether or not the "mined" patterns contain useful information that can be used to identify record boundaries.

According to one embodiment of the invention, the pattern validator employs a number of criteria, including repeat frequency, pattern length, regularity, and document coverage. Some or all of these criteria of the criteria may be used in combination in evaluating whether a candidate pattern is the "best" pattern for identifying record boundaries. In one embodiment of the invention, each of the criteria is associated with a threshold that can either have a default value, or can be specified by a user.

In one embodiment of the invention, for each pattern identified by fuzzy pattern identifier 206, the following factors are considered for validation: pattern frequency, which is the number of times a pattern repeats in the original symbol sequence (i.e., before any replacement or removal is performed); pattern length, which is the length of the pattern in symbols; pattern regularity, which is the consistency with which each record identified by the pattern has the same size as the other records in the page; and pattern coverage, which is the content covered by the records identified by the pattern relative to the document.

Pattern regularity for a particular pattern can be calculated as the standard deviation of the number of words occurring in each record that results from application of the particular pattern to the document. The formula for computing pattern regularity may be expressed as:

$$PATREG(P_i)=STDEV(words(R_1), words(R_2), \ldots words(R_j))$$

In the above formula, $P_i$ is the "$i^{th}$" pattern of the candidate patterns identified by fuzzy pattern identifier 206, "j" is the number of records identified in web document 218 when $P_i$ is applied to web document 218, and "$R_n$" is the "$n^{th}$" record of those records.

Pattern coverage for a particular pattern can be calculated as the ratio of (a) the number of bytes in all of the records identified by the application of the particular pattern to web document 218 to (b) the total number of bytes in web document 218, including those that are not included in any identified record. The formula for computing pattern coverage may be expressed as:

$$PATCOV(P_i)=(bytes(R_1)+bytes(R_2)+ \ldots bytes(R_j))/bytes(document)$$

In one embodiment, all of the aforementioned factors are used to validate each candidate pattern, because most information is presented in a regular and contiguous format. The "best" pattern should have high frequency, large length, regularity equal to zero, and large coverage. In one embodiment of the invention, a threshold is associated with each of the aforementioned factors to filter out undesirable patterns. In one embodiment of the invention, only patterns with frequency and length above corresponding threshold values, regularity less than a corresponding threshold value, and coverage more than a corresponding threshold fraction are considered to be valid candidate patterns. In one embodiment of the invention, the best candidate pattern is picked by calculating an overall weight and picking the highest weight among the candidate patterns.

Record Boundary Identification

According to one embodiment of the invention, a candidate pattern identified by fuzzy pattern identifier 206 is applied to web document 218 by locating portions of web document 218 that correspond to the symbols in the candidate pattern, and marking the beginning and ending of those portions. These become the record boundaries. After the record boundaries for all records in web document 218 have been determined, the records defined by the record boundaries may be extracted from web document 218 and compiled into a "master" document with records from other web documents, for example.

Figure 4:
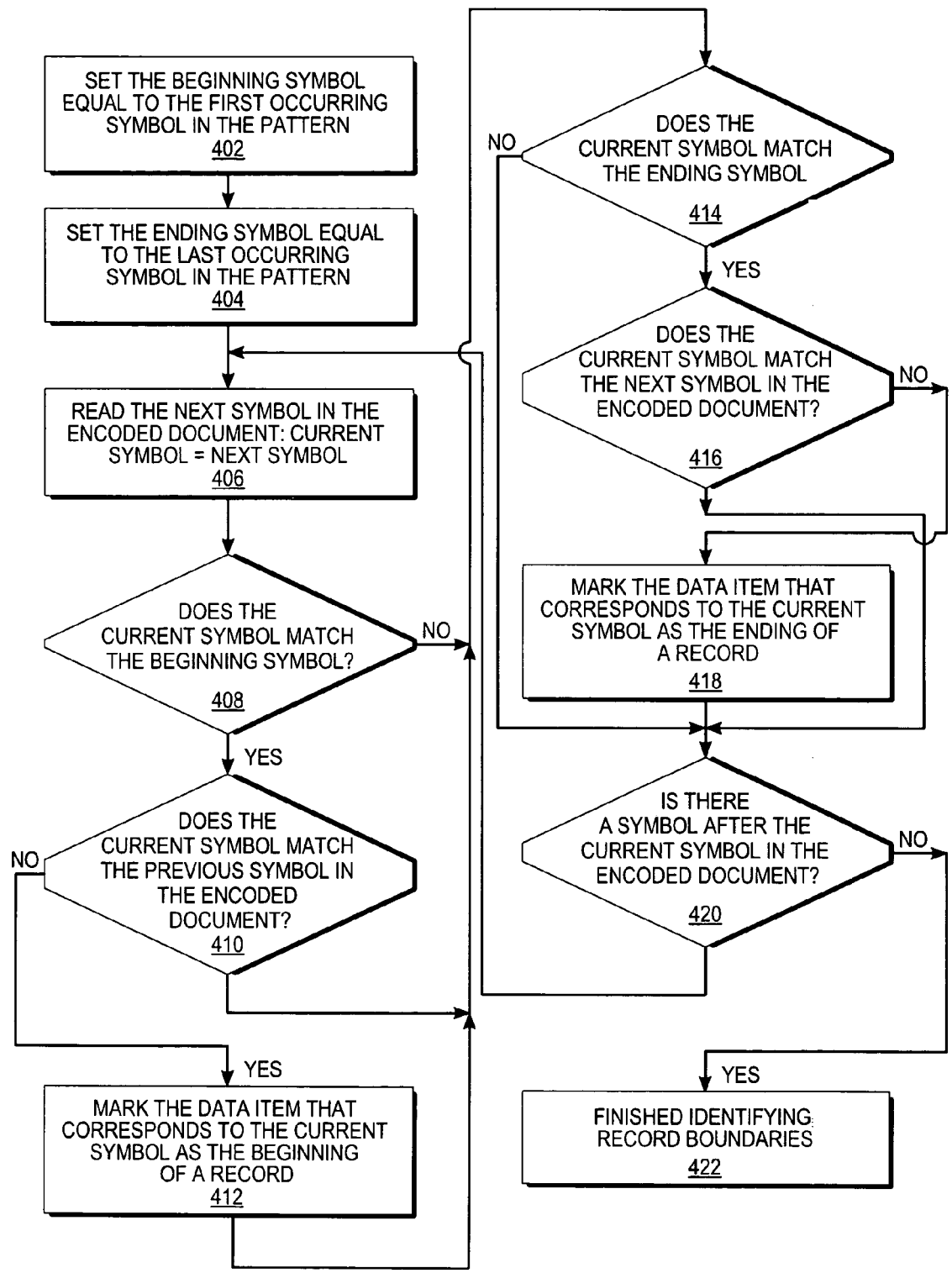
FIG. 4 is a flow diagram illustrating a technique for marking record boundaries based on an identified pattern, according to an embodiment of the invention.

FIG. 4 is a flow diagram illustrating a technique for marking record boundaries based on a symbol pattern, according to an embodiment of the invention. The technique illustrated operates on a fully encoded document (i.e., original symbol sequence) such as that produced by document encoder 202.

In block 402, a beginning symbol is set equal to the first occurring symbol in the pattern. In block 404, an ending symbol is set equal to the last occurring symbol in the pattern.

In block 406, the next symbol in the encoded document is read, and becomes the "current" symbol.

In block 408, it is determined whether the current symbol matches the beginning symbol. If the symbols match, then control passes to block 410. Otherwise, control passes to block 414.

In block 410, it is determined whether the current symbol is the same as the symbol that occurs immediately previous to the current symbol in the fully encoded document (i.e., the "previous" current symbol). If the current symbol is the same as the previous symbol, then control passes to block 414. Otherwise, control passes to block 412.

In block 412, the data item that corresponds to the current symbol is marked as the beginning of a record in original web document 218.

In block 414, it is determined whether the current symbol matches the ending symbol. If the symbols match, then control passes to block 416. Otherwise, control passes to block 420.

In block 416, it is determined whether the current symbol is the same as the symbol that occurs immediately after the current symbol in the fully encoded document (i.e., the "next" current symbol). If the current symbol is the same as the next symbol, then control passes to block 420. Otherwise, control passes to block 418.

In block 418, the data item that corresponds to the current symbol is marked as the ending of a record in original web document 218.

In block 420, it is determined whether there is a symbol after the current symbol in the fully encoded document. If there is another symbol, then control passes back to block 406. Otherwise, control passes to block 422.

In block 422, the record boundary identification process is completed. The discrete records in original web document 218 may be identified by their marked beginnings and endings. Thus identified, the records may be extracted from original web document 218 and used for various purposes.

For example, if the pattern identified by fuzzy pattern identifier 206 were "H, J, B, char(1), L, D, B, char(2), A," then the beginning symbol would be "H" and the ending symbol would be "A." Based on this pattern and the application of the foregoing boundary identification technique, the records identified in the document of FIG. 1 would include a record for the "Software Engineer" job, a record for the "System Administrator" job, and a record for the "Project Manager" job. Each of these records would begin with the "<H2>" tag preceding the job title, which tag corresponds to the beginning symbol, and end with the <a> tag, which tag corresponds to the ending symbol.

Hardware Overview

Figure 5:
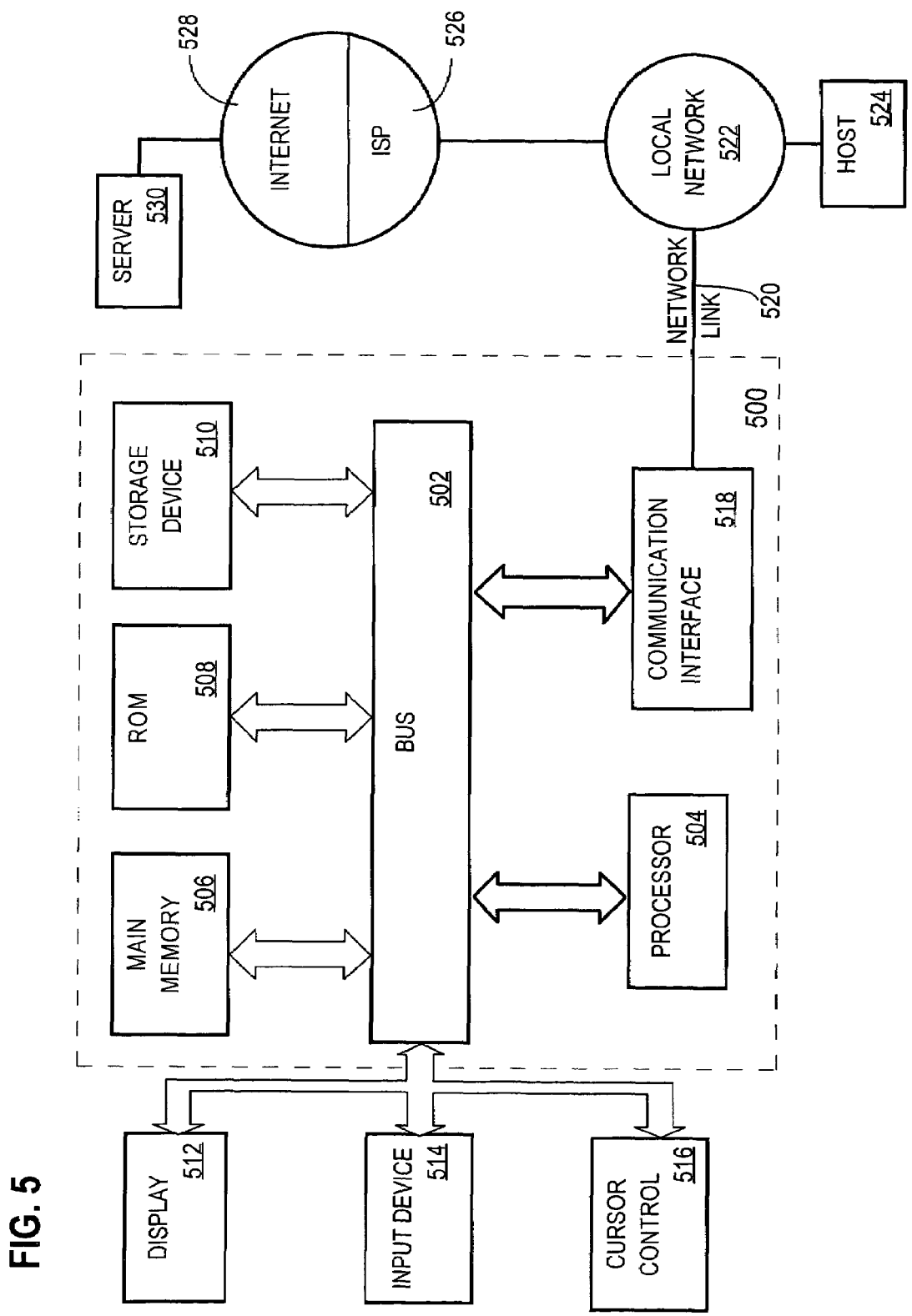
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of encoding data, the method comprising:
locating, by a computer in a set of data, one or more primary data items that match one or more patterns in a set of specified patterns, wherein the patterns in the set of specified patterns correspond to symbols;
for each primary data item of the one or more primary data items, performing steps comprising:
determining the symbol that is associated with the pattern that the primary data item matches, and
replacing the primary data item in the set of data with the symbol;
after performing the replacing, locating, in the set of data, one or more secondary data items that existed in the set of data prior to the replacing;
for each secondary data item of the one or more secondary data items, performing particular steps comprising:
generating a hash value based on the secondary data item; and
replacing the secondary data item in the set of data with a symbol that is associated with the hash value;
wherein the set of data corresponds to a first document that contains multiple records; and
determining boundaries for each record in the first document based on symbols that have replaced the secondary data items in the set of data.

2. The method of claim 1, further comprising:
extracting the records from the first document based on the boundaries, and
compiling the records with additional records that are contained in a second document to form a third document that contains records from the first document and records from the second document.

3. The method of claim 1, wherein:
at least one of the primary data items is an HTML tag; and
determining the symbol that is associated with the pattern that the primary data item matches comprises determining a symbol that is associated with a type of the HTML tag.

4. A method of encoding data, the method comprising:
locating, by a computer in a set of data, one or more primary data items that match one or more patterns in a set of specified patterns, wherein the patterns in the set of specified patterns correspond to symbols;
for each primary data item of the one or more primary data items, performing steps comprising:
determining the symbol that is associated with the pattern that the primary data item matches, and
replacing the primary data item in the set of data with the symbol;
after performing the replacing, locating, in the set of data, one or more secondary data items that existed in the set of data prior to the replacing;
for each secondary data item of the one or more secondary data items, generating a hash value based on the secondary data item;
determining whether a particular primary data item is an HTML tag;
in response to determining that the particular primary data item is an HTML tag, determining whether a type of the HTML tag is a type that is included in a specified set of HTML tag types; and
in response to determining that the type is not included in the specified set of HTML tag types, removing the particular primary data item from the set of data.

5. The method of claim 1, wherein determining the symbol that is associated with the pattern that the primary data item matches comprises:
- determining a category to which the primary data item belongs; and
- determining a symbol that is associated with the category.

6. A method of identifying patterns, the method comprising:
- locating, by a computer in a primary sequence of symbols, one or more secondary sequences, each of which consists of two or more consecutive occurrences of a particular symbol;
- for each secondary sequence of the one or more secondary sequences, replacing the secondary sequence in the primary sequence with a single occurrence of a symbol that occurs within the secondary sequence;
- after performing the replacing for each secondary sequence of the one or more secondary sequences, locating, in the primary sequence, one or more tertiary sequences, each of which consists of two or more consecutive occurrences of a particular two-symbol sequence; and
- for each tertiary sequence of the one or more tertiary sequences, replacing the tertiary sequence in the primary sequence with a single occurrence of a two-symbol sequence that occurs within the tertiary sequence;
- for each different secondary sequence of the one or more secondary sequences, adding, to a list of candidate repeating patterns, a single occurrence of a symbol that occurs within the different secondary sequence; and for each different tertiary sequence of the one or more tertiary sequences, adding, to the list of candidate repeating patterns, a single occurrence of a two-symbol sequence that occurs within the different tertiary sequence;
- determining boundaries for each record in the first document based on one or more candidate repeating patterns in the list of candidate repeating patterns;
- extracting the records from the first document based on the boundaries, and compiling the records with additional records that are contained in a second document to form a third document that contains records from the first document and records from the second document; and
- wherein the primary sequence of symbols corresponds to a first document that contains multiple records.

7. The method of claim 6, further comprising:
- before performing the replacing for each secondary sequence of the one or more secondary sequences, removing, from the primary sequence, symbols that occur only once in the primary sequence.

8. The method of claim 6, further comprising:
- for each particular sequence of one or more symbols in the list of candidate repeating patterns, determining whether the particular sequence satisfies one or more criteria, and if the particular sequence does not satisfy the one or more criteria, then removing the particular sequence from the list of candidate repeating patterns.

9. The method of claim 8, wherein at least one criterion of the one or more criteria is based on a number of times that the particular sequence occurs within the primary sequence.

10. The method of claim 8, wherein at least one criterion of the one or more criteria is based on a length of the particular sequence.

11. The method of claim 8, wherein at least one criterion of the one or more criteria is based on a consistency of sizes of records that are determined based on the particular sequence.

12. The method of claim 8, wherein at least one criterion of the one or more criteria is based on an extent to which records that are determined based on the particular sequence comprise the entirety of the first document.

13. The method of claim 6, further comprising:
- after performing the replacing for each tertiary sequence of the one or more tertiary sequences, locating, in the primary sequence, one or more quaternary sequences, each of which consists of two or more consecutive occurrences of a particular three-symbol sequence; and
- for each quaternary sequence of the one or more quaternary sequences, replacing the quaternary sequence in the primary sequence with a single occurrence of a three-symbol sequence that occurs within the quaternary sequence.

14. A volatile or non-volatile computer-readable storage medium carrying one or more sequences of instructions which, when executed by one or more processors, causes the one or more processors to perform the method recited in claim 1.

15. A volatile or non-volatile computer-readable storage medium carrying one or more sequences of instructions which, when executed by one or more processors, causes the one or more processors to perform the method recited in claim 2.

16. A volatile or non-volatile computer-readable storage medium carrying one or more sequences of instructions which, when executed by one or more processors, causes the one or more processors to perform the method recited in claim 3.

17. A volatile or non-volatile computer-readable storage medium carrying one or more sequences of instructions which, when executed by one or more processors, causes the one or more processors to perform the method recited in claim 4.

18. A volatile or non-volatile computer-readable storage medium carrying one or more sequences of instructions which, when executed by one or more processors, causes the one or more processors to perform the method recited in claim 5.

19. A volatile or non-volatile computer-readable storage medium carrying one or more sequences of instructions which, when executed by one or more processors, causes the one or more processors to perform the method recited in claim 6.

20. A volatile or non-volatile computer-readable storage medium carrying one or more sequences of instructions which, when executed by one or more processors, causes the one or more processors to perform the method recited in claim 7.

21. A volatile or non-volatile computer-readable storage medium carrying one or more sequences of instructions which, when executed by one or more processors, causes the one or more processors to perform the method recited in claim 8.

22. A volatile or non-volatile computer-readable storage medium carrying one or more sequences of instructions which, when executed by one or more processors, causes the one or more processors to perform the method recited in claim 9.

23. A volatile or non-volatile computer-readable storage medium carrying one or more sequences of instructions which, when executed by one or more processors, causes the one or more processors to perform the method recited in claim 10.

24. A volatile or non-volatile computer-readable storage medium carrying one or more sequences of instructions which, when executed by one or more processors, causes the one or more processors to perform the method recited in claim 11.

25. A volatile or non-volatile computer-readable storage medium carrying one or more sequences of instructions which, when executed by one or more processors, causes the one or more processors to perform the method recited in claim 12.

26. A volatile or non-volatile computer-readable storage medium carrying one or more sequences of instructions which, when executed by one or more processors, causes the one or more processors to perform the method recited in claim 13.

* * * * *

UNITED STATES PATENT AND TRADEMARK OFFICE
CERTIFICATE OF CORRECTION

PATENT NO. : 7,606,816 B2  Page 1 of 1
APPLICATION NO. : 11/192620
DATED : October 20, 2009
INVENTOR(S) : Parashuram Kulkarni It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Twelfth Day of October, 2010

David J. Kappos
*Director of the United States Patent and Trademark Office*